Patented Jan. 16, 1945

2,367,301

UNITED STATES PATENT OFFICE 2,367,301

PRODUCTION OF ANHYDROUS HYDROGEN CHLORIDE

Albert C. Mohr, Berkeley, Calif., assignor to Stauffer Chemical Company, a corporation of California No Drawing. Application May 29, 1942, Serial No. 445,069

4 Claims. (Cl. 23—154)

This invention relates to the production of anhydrous hydrogen chloride. The production of this material has heretofore been very difficult and expensive. The process of the present invention enables it to be produced in quantity, in relatively simple, inexpensive equipment and at relatively low cost.

Briefly and concisely stated, the process of this invention comprises treatment of the usual hydrochloric acid of commerce with sulphuric acid. A typical hydrochloric acid of commerce is made by dissolving hydrogen chloride in water until the HCl content is about 30% or more. The temperature at which the treatment is effected is such that hydrogen chloride gas is evolved while the water is taken up by the sulphuric acid. The hydrogen chloride gas stream is passed over aluminum chloride which is effective to remove any trace of water present and, at the same time, any sulphuric acid carried in the hydrogen chloride, liberating hydrogen chloride instead.

The invention may be made further apparent by considering the following specific operation set forth by way of example and not by way of limitation but which otherwise exemplifies the practice of the process of this invention. A vertical rectification column was set up having multiple bubble plates. A stream of 98% sulphuric acid was passed down through the column. A stream of typical commercial hydrochloric acid containing 31.45% hydrogen chloride was fed into the column at about the mid point of the column. To provide heat for liberation of hydrogen chloride, the hydrochloric acid was preferably heated to 215° F. prior to its introduction into the column. From the base of the column a stream of weak sulphuric acid was withdrawn while from the top of the column a gas stream composed of substantially anhydrous hydrogen chloride was taken off. The bottom part of the column acted as a stripper to boil off hydrogen chloride gas which passed upwardly countercurrent to the descending stream of strong sulphuric acid which effectively dried the hydrogen chloride so that its water content was only 0.005% by volume. This substantially anhydrous hydrogen chloride was then passed up through a mass of aluminum chloride arranged in loose masses on several superimposed suitable screen supports, the material being in granular form to provide ready gas permeability.

In practice 6200 pounds of 31.45% hydrochloric acid were converted into substantially anhydrous hydrogen chloride by utilizing 9500 pounds of 98% sulphuric acid. The acid recovered from the bottom of the column is reduced in strength to about 68%.

The hydrogen chloride removed from the aluminum chloride contact mass was collected and subsequently liquified under pressure.

I claim:

1. A process for production of anhydrous hydrogen chloride comprising contacting an aqueous solution of hydrogen chloride with sulphuric acid of a strength and in a volume sufficient to take up substantially all water present in said aqueous solution, the mixture being at a temperature sufficiently elevated to drive off hydrogen chloride as a gas, and passing the so released hydrogen chloride over substantially anhydrous aluminum chloride to remove any remaining water and any sulphuric acid and sulphur dioxide present in said hydrogen chloride.

2. A process for production of anhydrous hydrogen chloride comprising passing a stream of strong sulphuric acid down through a rectification column, passing a stream of hot hydrochloric acid in at an intermediate point in said column, removing weak sulphuric acid from the bottom of the column, removing substantially dry hydrogen chloride gas from the top of the column and passing it over substantially anhydrous aluminum chloride.

3. A process for production of anhydrous hydrogen chloride comprising passing a stream of about 98% sulphuric acid down through a rectification column, passing a stream of about 32% hydrochloric acid at a temperature of about 215° F. in at an intermediate point in said column, removing weak sulphuric acid from the bottom of the column, removing substantially dry hydrogen chloride gas from the top of the column and passing it over substantially anhydrous aluminum chloride.

4. The method of producing substantially anhydrous and impurity-free hydrogen chloride comprising commingling aqueous hydrochloric acid solution and concentrated sulphuric acid whereby hydrogen chloride gas is formed and thereafter contacting said hydrogen chloride gas with anhydrous aluminum chloride.

ALBERT C. MOHR.